US010519613B2

(12) United States Patent
Steeg et al.

(10) Patent No.: US 10,519,613 B2
(45) Date of Patent: *Dec. 31, 2019

(54) METHOD FOR MOUNTING A RELEASABLE MILLING UNIT TO A MACHINE FRAME OF A GROUND MILLING MACHINE

(71) Applicant: BOMAG GmbH, Boppard (DE)

(72) Inventors: Thomas Steeg, Badenhard (DE); Maximilian Philippsen, Gingen an der Fils (DE); Steffen Wachsmann, Koblenz (DE)

(73) Assignee: BOMAG GmbH, Boppard (DE)

(*) Notice: Subject to any disclaimer, the term of this patent is extended or adjusted under 35 U.S.C. 154(b) by 0 days.

This patent is subject to a terminal disclaimer.

(21) Appl. No.: 16/239,892

(22) Filed: Jan. 4, 2019

(65) Prior Publication Data
US 2019/0136469 A1 May 9, 2019

Related U.S. Application Data

(63) Continuation of application No. 15/343,462, filed on Nov. 4, 2016, now Pat. No. 10,174,465.

(30) Foreign Application Priority Data

Nov. 6, 2015 (DE) .......................... 10 2015 014 355
Dec. 21, 2015 (DE) .......................... 10 2015 016 678

(51) Int. Cl.
E01C 23/088 (2006.01)
B62D 65/02 (2006.01)
E01C 23/12 (2006.01)

(52) U.S. Cl.
CPC ............ E01C 23/088 (2013.01); B62D 65/02 (2013.01); E01C 23/127 (2013.01)

(58) Field of Classification Search
CPC .............................. E01C 23/088; E01C 23/127
See application file for complete search history.

(56) References Cited

U.S. PATENT DOCUMENTS

| 5,605,207 | A | 2/1997 | Belcher et al. |
| 8,424,972 | B2 | 4/2013 | Berning et al. |
| 8,474,919 | B2 | 7/2013 | Cipriani et al. |
| 8,770,668 | B2 | 7/2014 | Hall et al. |
| 10,174,465 | B2 * | 1/2019 | Steeg ..................... B62D 65/02 |
| 2004/0156703 | A1 | 8/2004 | Benedikt |
| 2008/0193210 | A1 | 8/2008 | Beales |

(Continued)

FOREIGN PATENT DOCUMENTS

| DE | 102011018222 A1 | 10/2012 |
| DE | 102013005594 A1 | 10/2014 |

(Continued)

OTHER PUBLICATIONS

English Machine Translation of DE102013005594A1, published Oct. 9, 2014 (1 page).

(Continued)

Primary Examiner — Janine M Kreck
(74) Attorney, Agent, or Firm — Wood Herron & Evans LLP

(57) ABSTRACT

The present invention relates to methods for mounting a milling unit of a ground milling machine and to a ground milling machine comprising a mountable and dismountable milling unit.

7 Claims, 13 Drawing Sheets

(56) References Cited

U.S. PATENT DOCUMENTS

| | | |
|---|---|---|
| 2012/0284989 A1 | 11/2012 | Busley et al. |
| 2013/0170941 A1 | 7/2013 | Drott et al. |
| 2014/0379227 A1 | 12/2014 | Reuter et al. |
| 2016/0040371 A1 | 2/2016 | Roetsch et al. |
| 2016/0040372 A1 | 2/2016 | Eiden |
| 2017/0328018 A1 | 11/2017 | Mannebach et al. |

FOREIGN PATENT DOCUMENTS

| | | |
|---|---|---|
| DE | 102013007161 A1 | 10/2014 |
| DE | 102014011856 A1 | 2/2016 |

OTHER PUBLICATIONS

English Machine Translation of DE102013007161A1, published Oct. 30, 2014 (1 page).

* cited by examiner

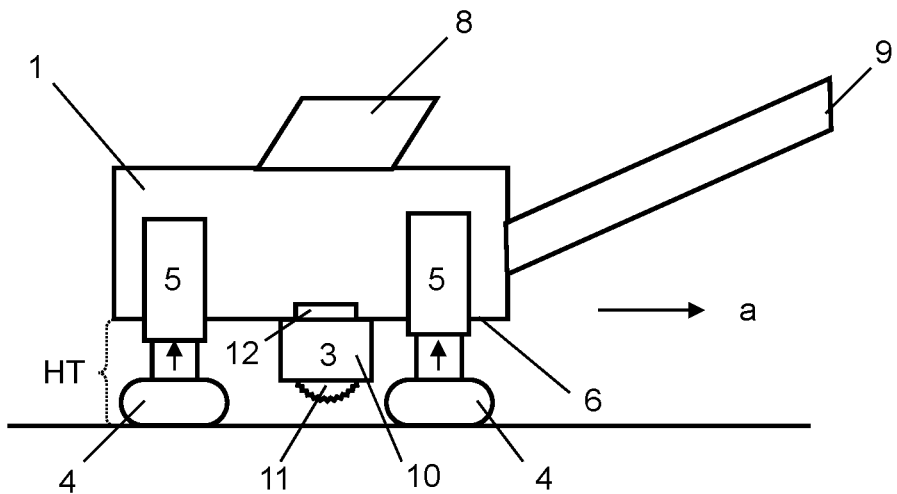
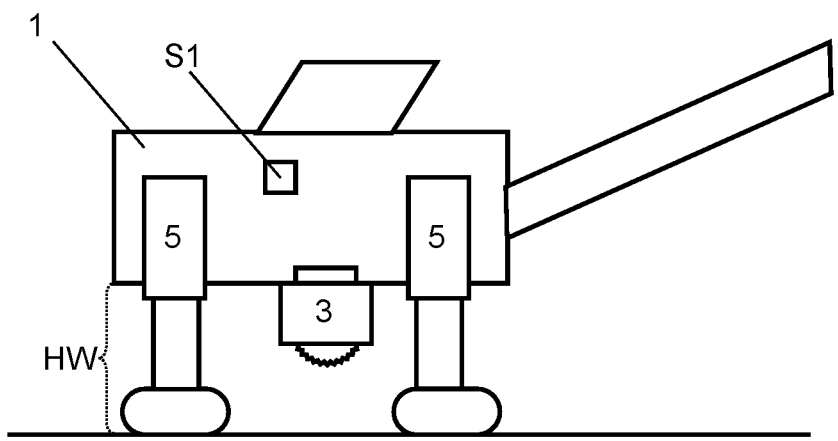
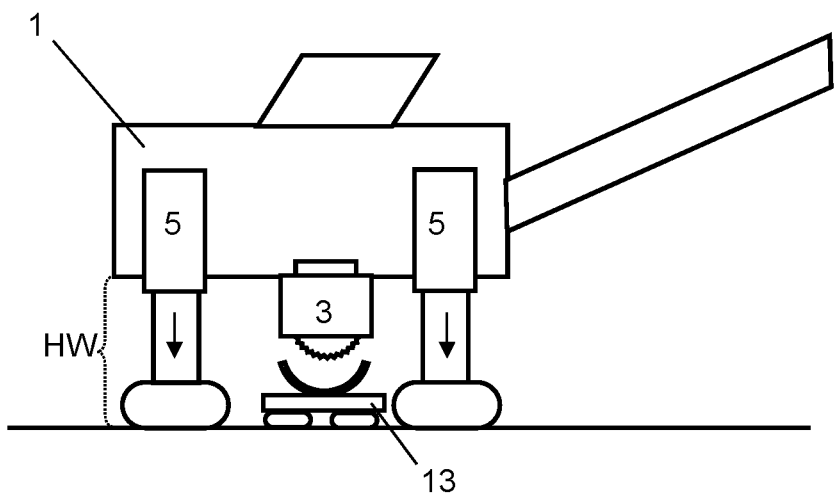

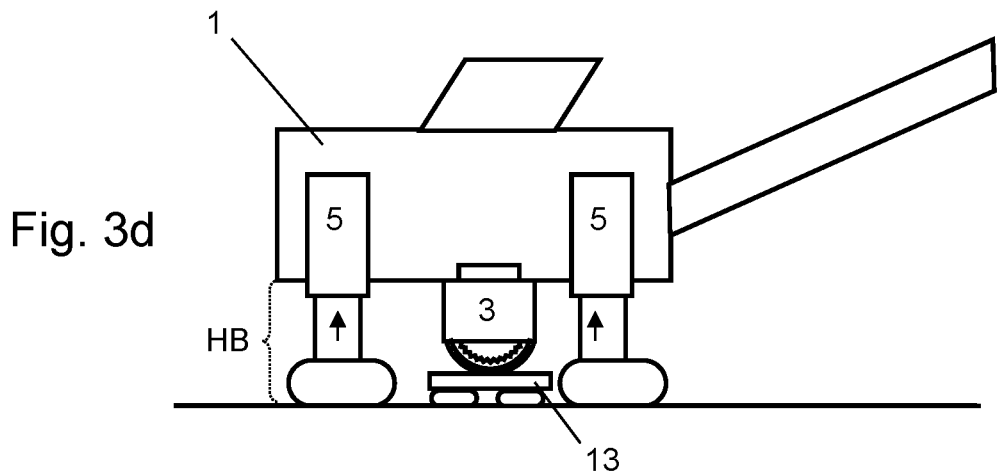
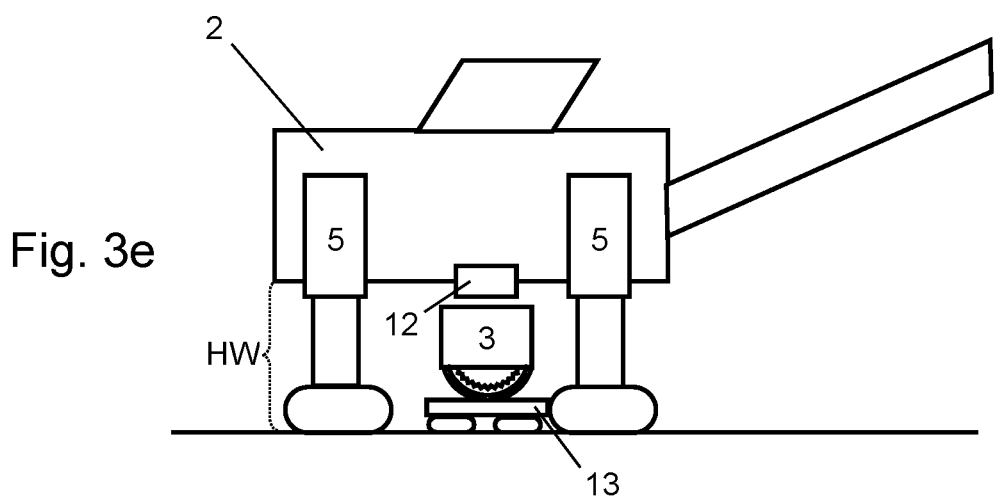
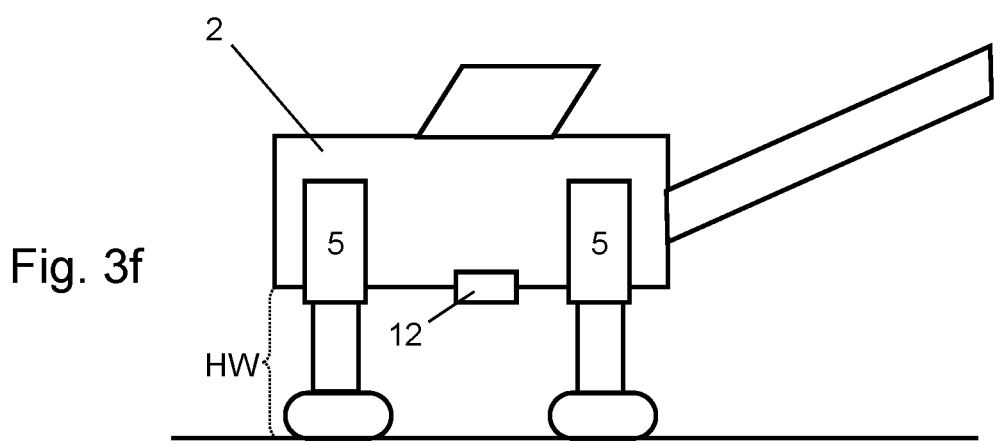

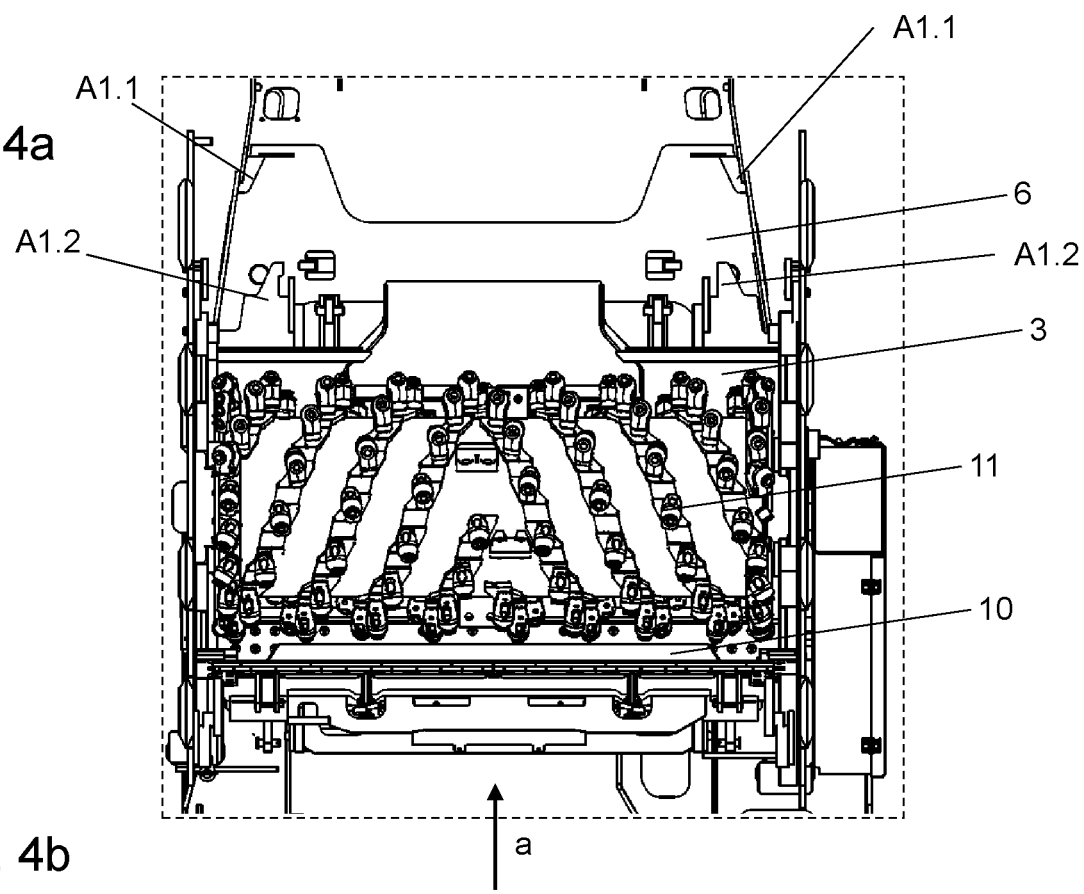
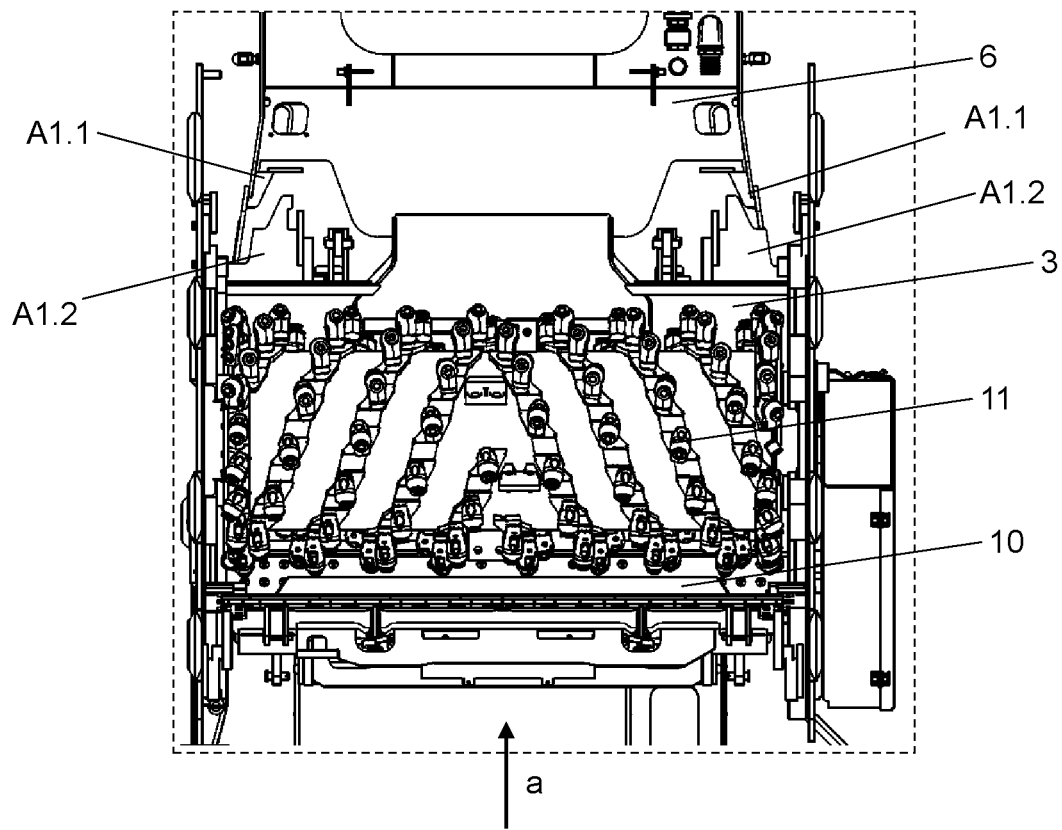

METHOD FOR MOUNTING A RELEASABLE MILLING UNIT TO A MACHINE FRAME OF A GROUND MILLING MACHINE

CROSS-REFERENCE TO RELATED APPLICATIONS

The present application is a Continuation application of U.S. Ser. No. 15/343,462, filed Nov. 4, 2016, now U.S. Pat. No. 10,174,465, issued on Jan. 8, 2019, which claims priority under 35 U.S.C. § 119 of German Patent Application No. 10 2015 014 355.7, filed Nov. 6, 2015, and German Patent Application No. 10 2015 016 678.6, filed Dec. 21, 2015, the disclosures of which are hereby incorporated herein by reference in their entireties.

FIELD OF THE INVENTION

The present invention relates to methods for mounting and/or changing a milling unit of a ground milling machine, as well as to a ground milling machine comprising a dismountable and mountable or exchangeable milling unit according to the independent claims.

BACKGROUND OF THE INVENTION

Essential elements of a generic ground milling machine are a machine part having a machine frame, an operator platform, a drive engine as well as travelling devices driven by the drive engine, such as wheels and/or crawler tracks. The travelling devices are connected to the machine frame via height-adjustable lifting columns so that the distance of the machine frame to the ground in the vertical direction can be adjusted by adjusting the lifting columns. Furthermore, a generic ground milling machine comprises a milling unit having a milling drum for milling ground material and a milling drum box for covering the milling drum to the sides and upward. The milling unit can be detachably fastened via a fastening device fastening the milling drum box to the ground milling machine. Such a ground milling machine is known from DE 10 2011 018 222 A1, for example. The invention described therein particularly relates to road milling machines.

Generic ground milling machines are usually used in road and pathway construction. Ground milling machines of the road cold milling machine type are used for milling off a road surface layer for road renewal. An essential aspect for the application range of such a ground milling machine is the width of the milling drum arranged on said ground milling machine, the milling drum usually being a hollow-cylindrical unit with a plurality of milling tools being arranged in a known manner on the outer jacket surface of said unit. The milling drum is usually supplied with drive energy by the drive unit of the ground milling machine, for example, via a mechanic or hydraulic drive train. The milling drum rotates inside a milling drum box about a horizontal rotation axis extending transversely to the working direction and mills off ground material when in a state immersed in the ground. Here, the milling drum box relates to a housing-like entirety with the milling drum being arranged therein and protruding toward the ground. The milling drum box prevents milled material from being thrown around in an uncontrolled manner during working operation and additionally provides a compartment for controlled guidance of milled material. In other words, the milling drum box, while being open toward the ground, surrounds the milling drum partially in the horizontal direction and in the vertical direction upwards. It is known to design the milling unit as a demountable entirety, comprising the milling drum and the milling drum box, at the machine part of the ground milling machine. For example, demounting the milling unit may be desired when the ground milling machine is to be lightened, for example, for transport purposes. Working times required for dismounting and mounting the milling unit from/to the machine part are, of course, desired to be as short as possible. Furthermore, there is often a need for being able to mill various milling widths with one and the same ground milling machine. To that end, it is preferred if various milling units can be mounted and quickly exchanged amongst one another on one and the same ground milling machine. In particular, this relates to the use of so-called large-scale milling machines having a milling unit arranged between the front and rear travelling devices. The option of dismounting the milling unit as an entirety from the machine part is described in DE 10 2011 018 222 A1, for example. To that end, the milling drum box is connected to the machine part in a detachable manner via massive fastening screws and corresponding lock nuts. The disadvantage of said configuration lies with the fact that the fastening screws are oftentimes hardly accessible, which is why other parts of the ground milling machine need to be removed first in order to allow access to the fastening screws. Moreover, the screws are comparatively large screws, so that a great force must be applied for mounting and dismounting. This is a challenge particularly in constricted space. Furthermore, in this alternative, time expenditure for the mounting and dismounting or changing of the milling unit is comparatively high as well. When referring to the dismounting and mounting of the milling unit hereinafter, this is to be understood as equally comprising mounting and dismounting one and the same milling unit as well as changing the milling unit, i.e., dismounting a first milling unit and mounting a second milling unit.

SUMMARY OF THE INVENTION

A principle of the present invention is to provide a method and a ground milling machine which enable, compared to known options of the prior art, mounting the milling unit to the machine part or machine frame more rapidly and more simple for an operator.

The method according to the present invention thus relates to a method for mounting/changing a milling unit of a ground milling machine and for aligning a releasable milling unit relative to a machine frame of a ground milling machine. Generally, the challenge of mounting the milling unit to the ground milling machine lies with bringing the milling unit into a position relative to the ground milling machine in which the fastening means have a relative position to one another in which the milling unit can be fastened to the ground milling machine. To that end, the two elements ground milling machine and milling unit usually need to be positioned relative to one another in a relatively precise manner. Typically, the milling unit is pre-positioned under the machine frame of the ground milling machine and then the desired final position of the milling unit relative to the ground milling machine is achieved in a highly elaborate manner by time-consuming maneuvering work until a final position is reached in which the milling unit can be fastened to the ground milling machine via the provided fastening elements. Now, one aspect of the present invention is to divide the alignment process by means of two alignment devices into a "pre-alignment phase" and a "fine alignment phase" and to thereby facilitate the whole process. The first alignment device is used for rough alignment, and the second alignment device is used for fine alignment. Accordingly, the essential steps of the method according to one embodiment of the present invention are:

a) rough alignment of the milling unit relative to the machine frame with a first alignment device; and subsequently b) fine alignment of the milling unit relative to the machine frame with a second alignment device.

As used herein, rough alignment relates to alignment movements by means of which the milling unit can be aligned relative to the machine frame of the ground milling machine by at most a few decimeters, in particular, a few centimeters relative to one another, and fine alignment particularly relates to alignment movements by means of which the milling unit can be aligned relative to the machine frame of the ground milling machine by at most a few centimeters, in particular, at most in the low single-digit range, and, in particular, by a few millimeters relative to one another. Here, rough alignment particularly includes compensation of transverse offset, i.e., an offset of the milling unit relative to the ground milling machine in the horizontal plane and perpendicular or transverse to the forward direction of advance or the longitudinal extension of the ground milling machine in the range of +/−150 mm max, in particular, +/−100 mm and more particular in the range of +/−50 mm with respect to the final position. Furthermore, rotational position deviations, i.e., rotations of the milling unit in the horizontal plane relative to the final position by at most +/−10°, in particular, +/−7°, and more particularly +/−4°, are also corrected by the alignment device for rough alignment. In contrast, the alignment device for fine alignment compensates deviations in the horizontal plane of at most +/−30 mm, in particular, +/−20 mm, and more particularly +/−10 mm, with respect to the final position, and thus concerns final alignment. A gradation of the alignment steps via individual alignment devices is advantageous in that a particularly efficient and reliable guiding of the two elements—milling unit and ground milling machine—toward their desired final relative position is possible, so that damage and wear to the fastening devices, for example, holding pins, lever elements, etc., can be reduced. Furthermore, it is possible to start with only a very imprecise placing of the milling unit relative to the ground milling machine at the beginning of the mounting process, so that time-consuming maneuvering works, in particular, with the transport unit, can be avoided since the milling unit is guided to the final fastening position by means of the first and the second alignment devices step by step. Then, the milling unit is fastened by means of a suitable fastening device and the functional connections are established. Functional connections are preferably achieved via a quick connector for corresponding line connections. Fastening is preferably effected via a quick coupling system driven via at least one actuator, such as driven in particular electrically, hydraulically and/or pneumatically. In particular, for establishing the support connection, the fastening system of the same Applicant disclosed in DE 10 2014 011 856.8, which corresponds to issued U.S. Pat. No. 9,951,483, may be used to that end. Reference is hereby made to the disclosure of said application.

The first and/or the second alignment device are preferably designed such that when moving one element (e.g., the ground milling machine without the milling unit), said devices guide the relative position of the two elements (ground milling machine without milling unit and milling unit) towards one another or to a desired relative position. Through the movement of one element, the other element can thus also be moved, or movement of one element causes movement, in particular, partially different movement, of the respective other element. Generally, for driving a movement of an element, an external drive such as an external vehicle, e.g., a forklift, etc., may be considered, although the use of the drive propulsion of the ground milling machine and/or the height adjustment drive of the lifting columns is preferred. Thus, rough alignment and/or fine alignment are preferably effected by moving the ground milling machine relative to the ground. In this regard, it is particularly preferred when rough alignment is effected by means of a forward and/or backward travelling movement or a lift adjustment of the ground milling machine and fine alignment is effected by lowering the ground milling machine or the machine frame.

Ideally, rough alignment and fine alignment are effected by means of elements via which the ground milling machine and the milling unit abut one another.

In step a), the ground milling machine is moved in a guided manner relative to the milling unit in and against the forward direction of advance, in particular, along wedge surfaces extending horizontally and inclined to the longitudinal axis of the ground milling machine or to the forward and/or backward direction of advance. Thus, the wedge surfaces achieve a guide surface along which a counter-element of the milling unit slides in the direction of the desired final position of the milling unit relative to the ground milling machine. Such a sliding guide operates in a particularly reliable manner and is relatively robust. Since the ground milling machine per se already has drive propulsion, additional driven special machinery for rough alignment between the two above mentioned elements are not required.

As an alternative, rough alignment according to step a) can be effected via swinging the milling unit, which is suspended from the machine frame. One aspect of the alternative configuration of the method according to the present invention is to use the gravitational force as a driving force for the rough alignment movement. Thus, said embodiment requires to initially suspend the milling unit from the machine frame of the ground milling machine. Appropriately, this is effected by means of flexible connections, as will be described in greater detail below. If the machine frame is lifted by the extension of the lifting columns, the milling unit is freely suspended from under the machine frame. If defined suspension conditions are met, the suspended milling unit always assumes the same position relative to the machine frame. Defined suspension conditions are in this case essentially characterized in that the suspension points on the milling unit and on the machine frame as well as the suspension elements, in particular, their length, are set. Ideally, suspension conditions are selected such that the milling unit already has its final position in terms of its horizontal alignment when reaching the final swing position, and thus the machine frame only needs to be lowered onto the milling unit yet.

Said swing process thus comprises the following steps. After placing the milling unit roughly under the machine frame of the ground milling machine, first a flexible suspension connection is established between the milling unit and the ground milling machine, in particular, the machine frame of the ground milling machine. To that end, at least three and, in particular, four individual suspension points are used which are spaced from one another and which, in particular, are located in the region of the upper four corners of the milling unit. As used herein, the term "flexible" is to be understood such that the suspension connection has at least one degree of freedom. In the end, the suspension connection is to achieve a swing-type suspension of the milling unit from the machine frame. For example, the flexible suspension connection may comprise holding points on the milling unit and on the machine frame as well as a connection structure such as a connecting rod, connecting members, connecting chains, etc. What is important is that the achieved suspension connection enables a certain movability of the milling unit when in the state suspended from the machine frame. Once the flexible suspension connection is established, the ground milling machine, respectively the machine frame, is lifted by extension of the lifting columns until the milling unit is lifted from the ground via the suspension connection. Once the milling unit does not have contact to the ground, it is suspended only via the suspension connection from the machine frame and then swings into the desired final position, in particular, of the rough alignment. If the ground milling machine or the machine frame is lowered by means of the retraction of the lifting columns, the milling unit touches the ground again, however this time in the desired horizontal position relative to the machine frame. After that, the ground milling machine is lowered further until it sits on the milling unit via the connection points for fastening the milling unit. Generally, if the aforesaid process occurs in a particularly precise manner, it is possible to omit a further step of fine alignment. However, due to existing unevenness and other imponderabilities, it turned out that a subsequent fine alignment yet to be described below in greater detail further simplifies the mounting process and makes it more reliable.

In step b) the ground milling machine is vertically displaced relative to the milling unit, in particular, the machine frame of the ground milling machine is lowered onto the milling unit, in particular, by retraction of the lifting columns. It is also in this case that the use of a sliding guide for fine alignment, specifically between the milling unit and the machine frame of the ground milling machine, is particularly preferred, in particular, along inclined slide surfaces extending vertically. Conical wedge surfaces having vertically extending longitudinal axes are particularly preferred.

Preferably, each of the alignment steps "rough alignment" and "fine alignment" is assigned a distinct drive. This allows a particularly reliable separation of said two steps and at the same time allows a particularly efficient mounting of the milling unit, since reaching the desired relative final positions of the milling unit relative to the ground milling machine is enabled in a reliable manner.

Another aspect of the present invention relates to a ground milling machine, in particular, for performing the method according to the present invention. Therefore, reference is made to the explanations of the method according to the present invention for the description of this aspect.

A generic ground milling machine comprises a machine frame, a drive engine, travelling devices driven by the drive engine and connected to the machine frame via height-adjustable lifting columns, and a milling unit with a milling drum for milling off ground material and a milling drum box for covering the milling drum toward the sides and upwards, and the milling unit is fastened or can be fastened in a detachable manner to the machine frame of the ground milling machine via a fastening device. In order to improve the mounting process of the milling unit, it is provided according to the present invention that a first and a second alignment device are present, which are designed for alignment of the released milling unit relative to the machine frame for fastening the milling unit to the machine frame, the first and second alignment devices being configured differently. Thus, the two alignment devices are devices that influence the relative position of the milling unit to be fastened on the ground milling machine and of the ground milling machine and, in particular, of its machine frame, and which, in particular, direct it to a final position in which the milling unit can be fastened to the ground milling machine via a suitable fastening device. According to the present invention, the two alignment devices preferably act functionally independently of one another. The two alignment devices thus each preferably comprise different means which act, in particular, between the milling unit and the ground milling machine, and which, in particular, successively, cause the alignment of the milling unit relative to the ground milling unit without milling unit. As a result, this enables designing the achieved extent of alignment, or the possible scope of alignment, in a graduated manner, which, in particular, reduces wear of fastening means and also the time required for the mounting process.

Reference is made to the above descriptions, in particular, with respect to the meaning of the terms "rough alignment" and "fine alignment".

It is ideal if the first and the second alignment device have means each at the milling unit and at the machine frame which are designed such that they get into contact or abutment with one another during the alignment process. Such means may, on the one hand, be elements protruding in the vertical direction, such as abutment blocks, bolts, pins, etc., and receiving elements such as depressions, boreholes, slide devices, such as inclined slide surfaces, etc. Generally, even a rail system can be applied.

Alignment is effected in a particularly reliable manner when the first and/or the second alignment device are form fit devices, in particular, having slide surfaces, in particular, shaped as cone and/or wedge surfaces. A wedge surface relates to a surface which in a vertical or horizontal reference plane extends inclined, i.e., in particular, at an angle relative to the forward/backward direction of advance of the ground milling machine or to a vertical axis. A counter-element (for example, on the side of the machine frame) abuts against said surface (e.g., on the side of the machine frame). If the wedge surface is moved relative to the counter-element in the forward/backward direction of advance or in the vertical direction, some kind of wedge drive mechanism results, by means of which the other element is also moved.

Devices of this type are particularly robust, simple in structure and deliver reliable results. Here, the first alignment device (rough alignment) may have wedge surfaces essentially acting in the horizontal direction and thus serve essentially for compensation of a transverse offset and/or rotations, as already described above. The wedge surfaces thus extend along the longitudinal extension of the ground milling machine preferably toward the center of the machine. Reference is made to the above explanations for details in this regard.

Specifically, for example, the first alignment device may comprise form fit elements, in particular, wedge wall elements, protruding in the vertical direction, and counter-elements may be provided, in particular, for abutment against the wedge wall elements, in particular, on the inner surfaces thereof, the form fit elements being arranged on the machine frame and the counter-elements being arranged on the milling unit, or vice versa.

Preferably, the wedge wall elements are arranged in opposing pairs on the longitudinal sides of the ground milling machine. The wedge surfaces extend appropriately in or against the forward direction of advance of the ground milling machine toward one another (in particular, in the horizontal plane) so that the horizontal distance of the wedge surfaces tapers in or against the forward direction of advance of the ground milling machine. This achieves an overall structure horizontally acting in a funnel-like manner, via which transverse offsets and/or rotations of the milling unit relative to the machine frame can be compensated to a comparatively large extent. The wedge surfaces may extend toward one another in a curved, stepped or even straight manner.

Additionally, or alternatively, the first alignment device may also comprise a flexible suspension connection between the milling unit and the ground milling machine, in particular, the machine frame, in particular, in the form of ropes, chains or straps. For rough alignment of the milling unit, in particular, relative to the machine frame, the suspension connection is provided, via which the milling unit can be suspended from the ground milling machine and particularly from under or below the machine frame temporarily. If the milling unit is suspended from the machine frame without contact to the ground, it swings into a defined position. This requires that the suspension points of the suspension connection as well as at least the length of the suspension elements are defined. If the milling unit is placed on the ground by the retraction of the lifting columns after reaching said defined swing position, it thus has a defined relative position with respect to the horizontal plane relative to the machine frame of the ground milling machine. If the machine frame is further lowered to the ground until reaching the milling unit, often times the fastening connection may already be established or, preferably, the second alignment device acts at this point or ideally already during the lowering process.

It is thus preferred if the first alignment device is a suspension swing via which the milling unit can be suspended from the machine frame of the ground milling machine. The suspension swing may have the aforementioned basic structure. It is preferred when parts of the suspension swing can be demounted and are only mounted for the mounting process between the milling unit and the machine frame. As an alternative, there may be a storage chamber on the machine frame, into which the connection elements of the suspension swing, when released from the milling unit, can be sunk, for example, pivoted. The advantage of this variant with a suspension swing is that the drive for rough alignment is achieved via the gravitational force. As a result, there is no need for a separate drive for alignment of the milling unit relative to the machine frame of the ground milling machine.

The second alignment device (fine alignment) preferably comprises wedge surfaces extending essentially in the vertical direction, such as conical surfaces protruding upward or downward. Said vertical wedge surface thus are at an angle to a vertical reference axis. Thus, if the wedge surface engages with counter-elements (as already described with respect to the first alignment device) and if the machine frame of the ground milling machine is lowered by a retraction of the lifting columns, the counter-elements thus move along the wedge surfaces, so that the relative position of the machine frame to the milling unit changes. The counter-elements and the wedge surfaces are correspondingly placed and designed in such a way that the milling unit and the ground milling machine get into the final position desired for fastening the milling unit by means of the fastening device. Using the height adjustability of the ground milling machine for fine alignment is advantageous also because said movement can be controlled in a very precise manner.

Specifically, the second alignment device preferably comprises trunnions or teeth standing vertically with their longitudinal axes, preferably conical trunnions, and receptacle bores or receptacle recesses as counter-elements, the trunnions or teeth being arranged on the machine frame and the receptacle bores and receptacle recesses being arranged on the milling unit, or vice versa. In this regard, reference is, in particular, made to DE 10 2014 011 856.8, which corresponds to issued U.S. Pat. No. 9,951,483, and to the basic structure described in said specification.

According to one embodiment of the present invention, the first alignment device and the second alignment device are functionally arranged in series. This means that, for the overall mounting process, first a rough alignment using the first alignment device is effected. The second alignment device may have no function at this point. If a desired final position of the milling unit relative to the ground milling machine has been reached with the first alignment device, the second alignment device takes effect, for example, by starting another movement of the ground milling machine relative to the milling unit, while, to that end, the respectively acting elements of the first alignment device may optionally remain engaged or may get disengaged. The advantage is that the two alignment devices can be designed in a graduated manner in terms of their maximum tolerance limits and, as a result, a very fast and also very precise alignment of the milling unit relative to the ground milling machine is possible.

In order to achieve a functional arrangement in series, it is preferred if the vertical height of the vertically protruding form fit elements of the first alignment device is greater than the vertical height of the trunnions or teeth of the second alignment device. This makes it possible to selectively only engage the first alignment device by means of a height adjustment of the lifting columns and only subsequently, by a further retraction of the lifting columns, additionally or alternatively, the second alignment device.

Finally, according to the present invention, it is preferred if the milling drum box is connected to the machine frame via a quick coupling system, particularly a lockable and unlockable quick coupling system, which can be operated from the operator platform and/or if a connection block for simultaneously connecting multiple fluid and/or supply connections between the milling unit and the remaining ground milling machine is provided. As a result, the time required for mounting and dismounting of the milling unit can be reduced even further. A corresponding quick coupling system for fastening the milling unit to the ground milling machine (corresponding to the fastening device) is disclosed in DE 10 2014 011 856.8, which corresponds to issued U.S. Pat. No. 9,951,483, for example.

BRIEF DESCRIPTION OF THE DRAWINGS

The present invention will be explained in more detail below with reference to the exemplary embodiments shown in the figures. In the schematic figures:

FIGS. 3a to 3k show the sequence of an exchanging process in a side view;

FIGS. 4a to 4c show detailed views concerning rough alignment with a first alignment device in a view from below to the milling unit and the bottom side of the ground milling machine;

FIG. 6b shows an enlarged detailed view of region A of FIG. 6a;

FIG. 7b shows an enlarged detailed view of region A of FIG. 7a; and

Like components are indicated with like reference numerals throughout the figures, wherein not each and every component necessarily is repeatedly indicated in each of the figures.

DETAILED DESCRIPTION OF THE INVENTION

Figure 1:
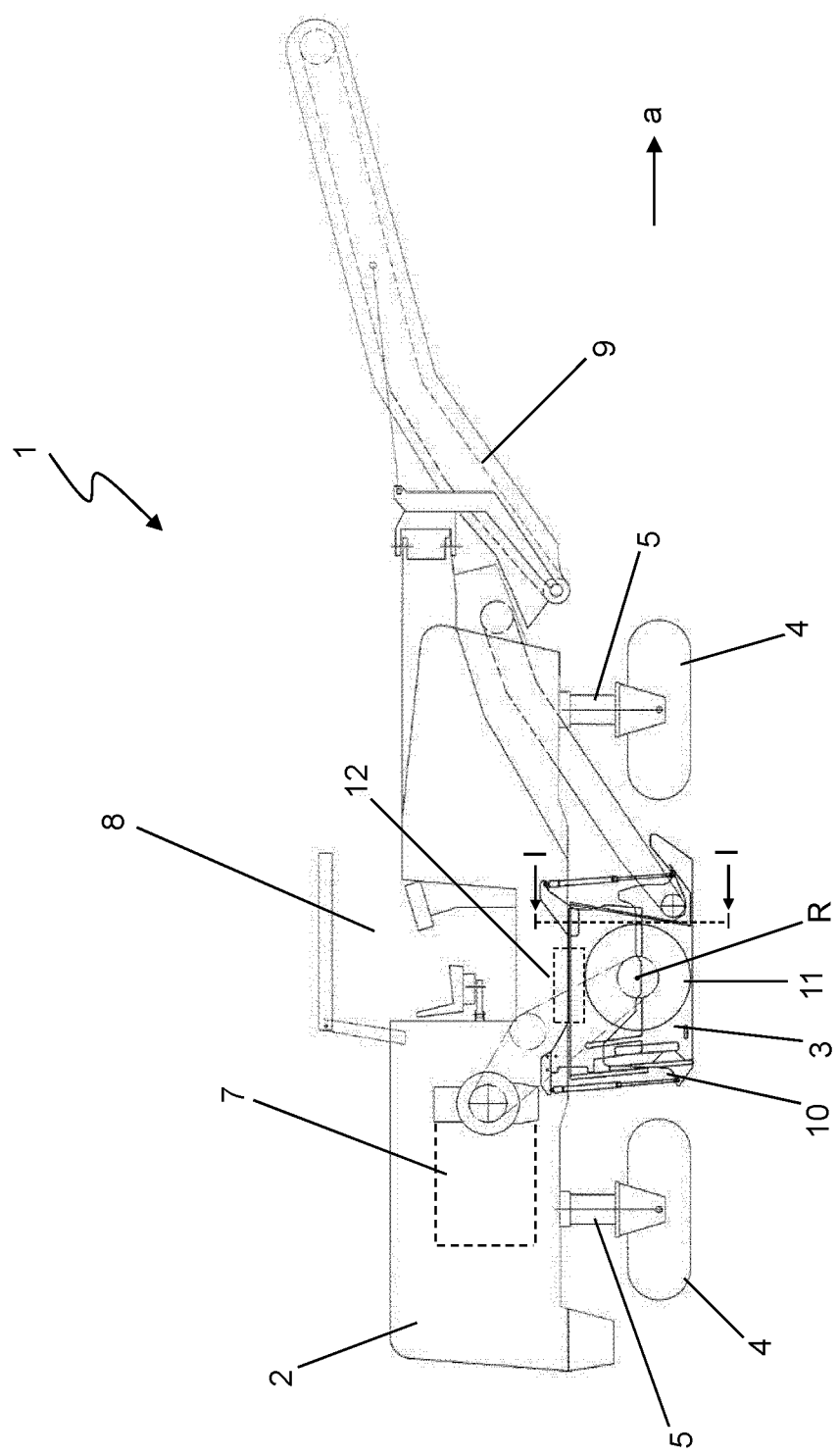
FIG. 1 shows a side view of a ground milling machine.

FIG. 1 shows a generic ground milling machine 1, in the present case a road cold milling machine. In this case, said machine specifically is a large-scale milling machine of the center rotor type. Essential elements of the ground milling machine are a machine part 2 and a milling unit 3. The machine part 2 includes a machine frame 6 supported by travelling devices 4 via lifting columns 5, with a drive engine 7, an operator platform 8 and a milled material conveyor device 9. The lifting columns 5 enable height adjustment of the machine frame 6 in the vertical direction relative to the ground. The drive engine 7 delivers the drive energy required for the drive propulsion and the drive of the milling device as described below. During working operation, operation of the ground milling machine 1 is effected from the operator platform 8 by an operator. During working operation, the ground milling machine 1 travels over the ground to be processed in the working direction and mills off milling material. This is specifically effected with the milling unit 3, comprising a milling drum box 10 as well as a milling drum 11, which is arranged inside the milling drum box 10. The milling drum box 10 all in all comprises a front wall, a rear wall, an upward cover located above the milling drum as well as covers to the sides to the right and to the left. The milling drum box 10 is designed to be open toward the ground, so that the milling drum 11 positioned within the milling drum box 10 can engage the ground. For the milling operation, the milling drum 11 rotates about a horizontal rotation axis R extending transversely to the working direction a.

The milling unit 3 is designed to be demountable as a modular unit relative to the machine part 2 of the ground milling machine 1, for example, for transport and exchange purposes. To that end, a fastening device 12 for connecting the milling unit 3 to the machine part 2 is provided, which is merely schematically shown in FIG. 1. The structure and functionality of said fastening device 12 will be explained in the following figures in greater detail by way of example. In the simplest case, these may be threaded bolts and corresponding nuts. It will be readily appreciated that for mounting/dismounting the milling unit 3 the drive train (functional connection), which in the present embodiment is partially designed as a belt drive, must be separated and re-established after installation of the milling unit 3. As an alternative, a drive connection to a hydraulic system is possible as well.

Figure 2:
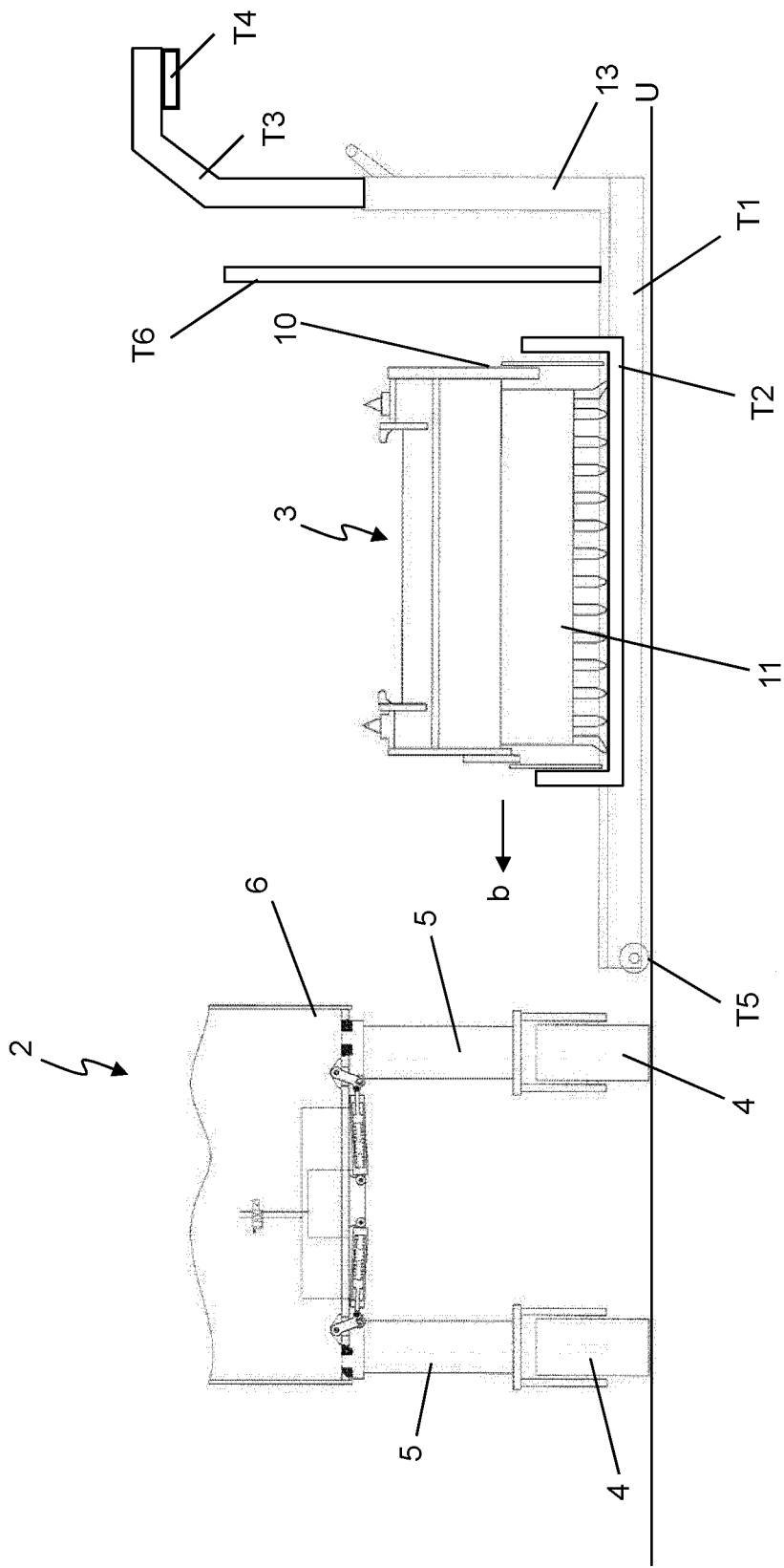
FIG. 2 shows a partial sectional view through the ground milling machine with separate milling unit.

FIG. 2 shows the state prior to the installation of the demounted milling unit 3, with the milled material conveyor device demounted, prior to the installation of the milling unit 3 at the machine part 2 in view direction of the arrows to section line I-I of FIG. 1. In the present exemplary embodiment, the milling unit 3 is slid via a special transport unit 13 in the direction b from a position laterally next to the machine part 2 transversely to the working direction a underneath the machine part 2 between the front and rear travelling devices 4. The machine frame 6 of machine part 2 is adjusted via lifting columns 5 in the vertical direction upward into an exchange adjustment position so that sufficient space is available underneath machine frame 6 of machine part 2. Machine part 2 and milling unit 3 are very roughly aligned to one another.

The transport unit 13 includes, for example, a base plate T1, on which a support device T2 is mounted for reception and positional stabilization of the milling unit 3. In particular, vertically protruding support walls are provided to that end, which stabilize the milling unit 3 to the face side. Furthermore, an upward projecting transport arm T3 is present, which has a corresponding counter-part T4 for engagement with a load arm of a swap body truck. On the face side of the base plate T1 opposite the transport arm T3, rolls T5 are present, which can roll on the ground U and thus enable easier movement of the transport unit 13. The transport unit 13 further comprises a wall vertically projecting toward the transport arm T3, said wall serving as an insertion limit T6 or stop. The wall extends in the vertical direction thus far that the wall does not fit into the region underneath the machine frame of the ground milling machine even when the lifting columns are in the exchange adjustment position. However, within the scope of the present invention, the important factor is that the milling unit is initially positioned under or underneath the ground milling machine 1 in any manner. Thus, transport unit 13 is to be understood as being optional.

FIGS. 3a to 3k emphasize further details of the present example of a method according to the present invention for dismounting and mounting or exchanging the milling unit 3, and reference is also made to the individual steps indicated in the general part of the description. Furthermore, a prior dismounting of the milling unit 3 is shown for a better understanding.

Figure 3G:
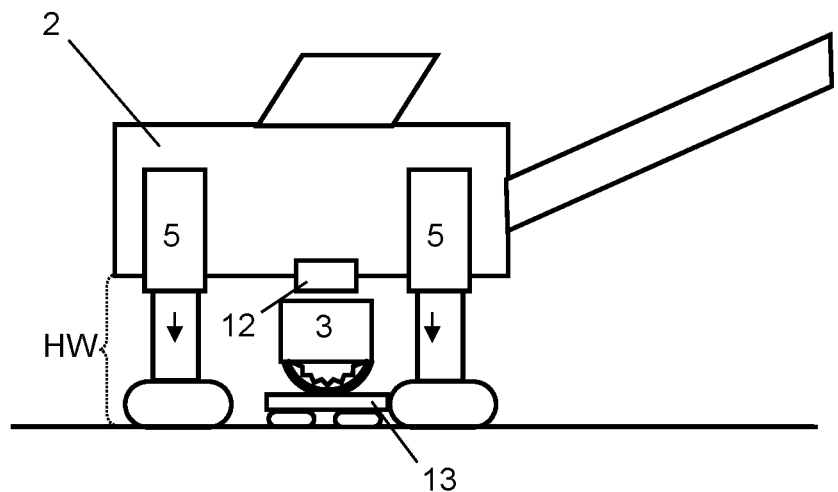

FIG. 3a is the starting point. The ground milling machine 1 here is in the transport adjustment position with respect to the height position of the lifting columns. In this state, the ground milling machine can be moved to a place of operation, for example. The milling machine does not engage the ground. Here, the machine frame is at height HT in the vertical direction above the essentially planar and horizontally extending ground U. If now the dismounting of the milling unit is initiated, first the lifting columns are optionally extended further in the arrow direction until reaching the exchange adjustment position according to FIG. 3b and the machine frame has a distance HW to the ground U. Said distance HW is larger than the distance HT. In this state, the center of mass of the ground milling machine is higher than in the transport adjustment position. Furthermore, a control unit S1 may be provided, which, when exceeding the height adjustment beyond the transport adjustment position or when reaching the exchange adjustment position, only allows a limited travelling operation, in particular, with respect to the maximum permitted travelling speed and/or distance. Here, the term "limited" is to be understood in that the maximum possible travelling speed is substantially less than in transport operation. Alternatively, or additionally, even the maximum permitted travelling distance in this state may be limited by the control unit S1. For the sake of clarity, the control unit is indicated as an example only in FIG. 3b, but relates to the entire process of FIGS. 3a to 3k. This "over-lift" of the height adjustment relative to the transport height HT is optional, however.

The ground clearance achieved below the milling unit is sufficiently great that the transport unit can be brought under the milling unit, for example, from the side transversely to the longitudinal direction of the ground milling machine (FIG. 3c). Now, the lifting columns are retracted in the arrow direction in said relative position of the transport unit 13 and the ground milling machine 1, thereby reducing the distance of the machine frame to the ground to become the distance HB, until the milling unit, as indicated in FIG. 3d, rests on the transport unit. Usually, the distance HB is between the distances HT and HW. In this state, existing connection fastenings of the milling unit to the remaining ground milling machine, usually to the machine frame thereof, are released. Furthermore, functional connections such as connections of the hydraulic system of the ground milling machine, electric connections and drive connections, are released, for example, by removing the drive belts or corresponding hydraulic connections.

For reaching distance HW, the lifting columns can be extended in the arrow direction again, with the milling unit, separated from the ground milling machine, remaining on the transport unit 13 (FIG. 3e). The transport unit will subsequently be pulled away from below the ground milling machine together with the milling unit 13 and may be loaded onto a truck, for example. FIG. 3f shows the state of the ground milling machine directly after removing the transport unit 13. On the one hand, it is now possible to lower the ground milling machine again to the height HT and to also load it onto a transport vehicle, for example, if merely dismounting and mounting the milling unit 13 is required. Mounting the same or a different milling unit is effected based upon the situation illustrated in FIG. 3f, i.e., ground milling machine 1 without milling unit 3 is brought into the exchange adjustment position HW according to FIG. 3f on a most horizontal and planar ground U, be it at the same location or at another location. However, the method according to the present invention also covers variants in which the milling machine is extended into its transport height HT or is jacked up via blocks on the ground for increasing ground clearance.

Figure 3H:
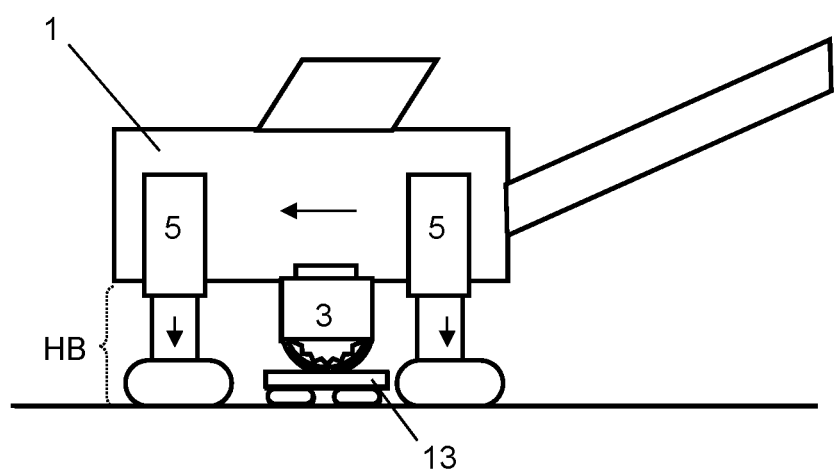

When the exchange adjustment position with ground clearance HW is reached (be it by means of an "over-lift", by jacking up onto blocks on the ground or, if sufficient, by extending the machine frame "only" in the transport position), the transport unit 13 may be moved under the ground milling machine 1 in the region between the front and rear travelling devices, as illustrated in FIG. 3g. An essential factor for connecting the milling unit 3 to the ground milling machine is that a correct and precise alignment of the milling unit 3 relative to the ground milling machine 1 is effected, so that the provided fastening devices between the milling unit 3 and the ground milling machine 1 can be used in an optimum manner and, to the extent possible, without wear. To that end, a two-stage alignment device is provided to be explained in greater detail below. FIG. 3g illustrates in this context already that a first rough alignment after a first slight lowering is effected by a forward and/or backward movement of the ground milling machine in and/or against the arrow direction, whereby respective guide elements at the milling unit 3 and at the ground milling machine 1 of a first alignment device get in a horizontal overlapping, whereby the milling unit 3 is roughly positioned relative to the ground milling machine. By a subsequent further lowering, the guide elements at the milling unit 3 and the ground milling machine 1 of a second alignment device get into a horizontal and vertical overlapping, resulting in fine alignment of the milling unit 3 relative to the ground milling machine 1. Here, the lifting columns are retracted until the ground milling machine almost or in fact rests on the milling unit (FIG. 3h, height HB). In this position, support and functional connections are established between the milling unit 3 and the ground milling machine 1, comprising, for example, the connection of hydraulic supply lines, electric connections and/or drive connections, such as, in particular, a belt connection for a drive belt transmission for driving the rotation of the milling drum of the milling unit. As an alternative, it is also possible to only establish the support connections or the fastening of the milling unit 3 to the ground milling machine 1, so that the milling unit can be lifted by the ground milling machine 1, and to close further connections later.

Figure 3I:
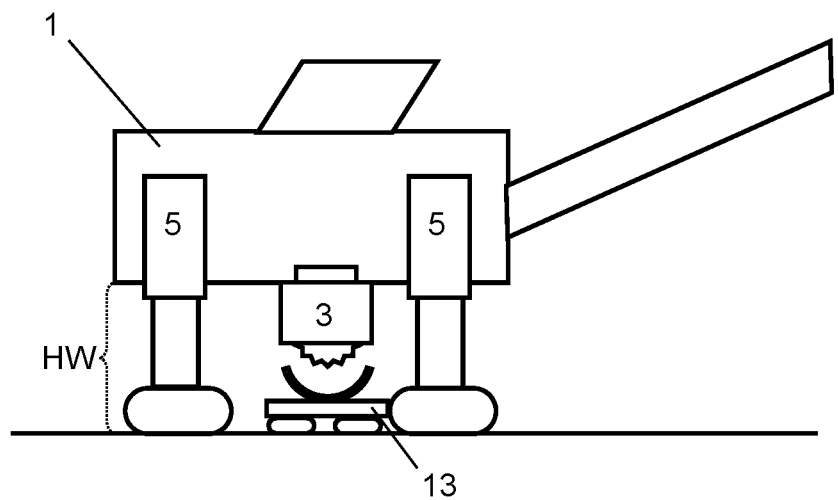
Figure 3J:
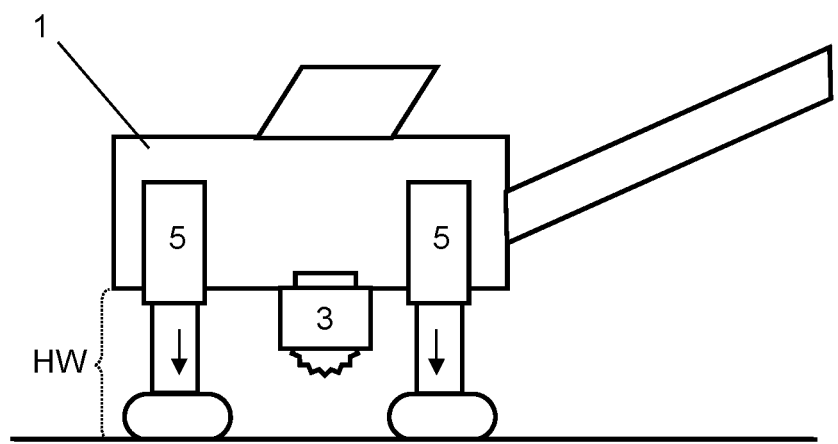
Figure 3K:
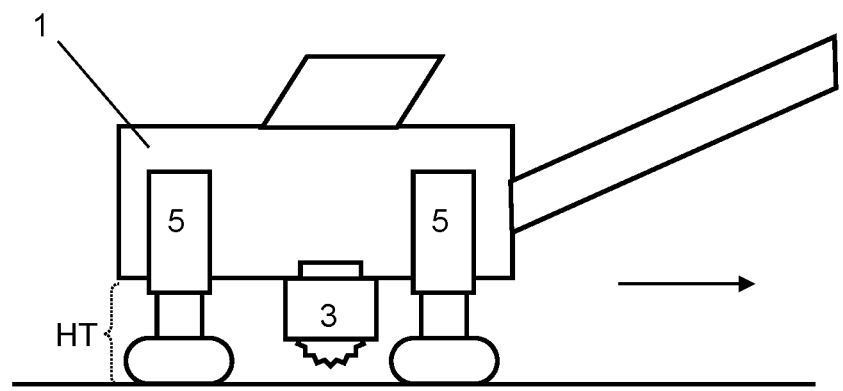

Subsequently, according to FIG. 3i, the ground milling machine 1, now including the milling unit 3, is lifted by extending the lifting columns until reaching height HW. Subsequently, removal of the transport unit 13 (if present) is effected under the ground milling machine (FIG. 3j) as well as lowering or retracting the lifting columns to a height HT (if an "over-lift" position had been assumed), so that a regular travelling operation of the ground milling machine is possible again.

The process shown in FIGS. 3a to 3k is merely to be understood as an explanation. An advantageous aspect with regard to the overall method shown in FIGS. 3a to 3k is that adjusting the height of the transport unit 13 is not required for dismounting and mounting the milling unit on the one hand, and, on the other hand, the ground milling machine 1 per se reaches a sufficient ground clearance by extending the lifting columns to the exchange adjustment position, so that the transport unit 13 can be placed under the machine, thus also enabling a fastening of the milling unit to the ground milling machine.

One variant also covered by the present invention lies with using longer lifting columns or lifting columns that enable a greater lift adjustment than lifting columns known so far. However, due to the construction-related tilt tendency of the machine when the lift columns are extended, it is also in this case that the height HW is reserved for the mounting and dismounting process and is not suitable for the regular travelling operation with the maximum height HT of the ground milling machine. For example, this may be ensured by the above-mentioned control unit S1. The present invention also includes variants, in which ground clearance of the machine frame of the ground milling machine is improved in that the ground milling machine jacks itself up, i.e., raises itself by moving onto blocks on the ground or comparable devices.

Figure 4C:
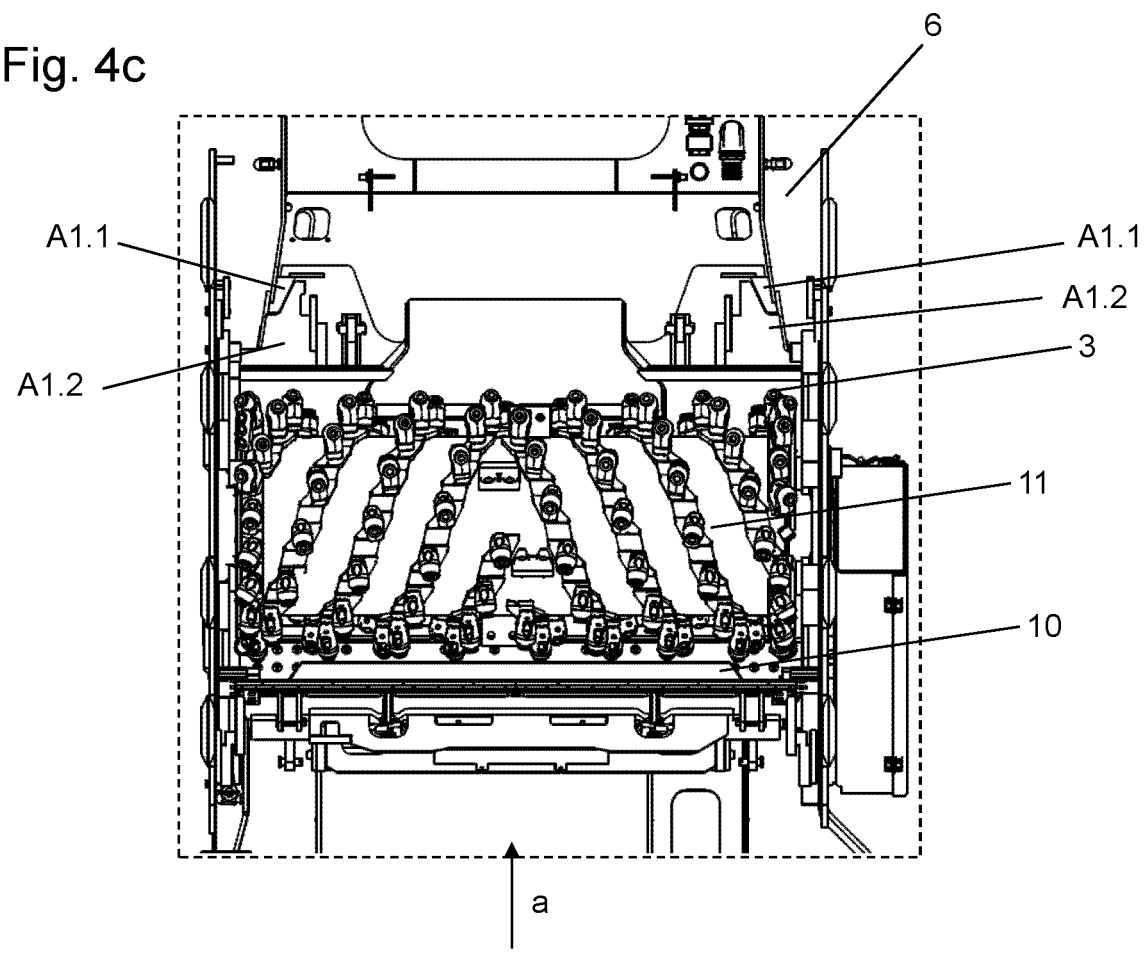

FIGS. 4a to 4c illustrate the effects of the first alignment device A1 for rough alignment. FIGS. 4a to 4c show the region between the front and the rear travelling devices in a view from below, i.e., ground U. Here, FIG. 4a corresponds to FIG. 3g. For the sake of clarity, the forward direction or the working direction a of the center rotor type milling machine is also indicated in FIGS. 4a to 4c.

Essential elements of the first alignment device A1 are wedge surfaces A1.1 arranged at the machine frame and wedge surfaces A1.2 arranged at the milling unit, said surfaces forming a form fit device, wherein in each case one pair with wedge surfaces A1.1 and A1.2 is arranged at the right side and at the left side. The wedge surfaces A1.1 protrude from the machine frame downward in the vertical direction and the wedge surfaces A1.2 protrude from the milling unit 3, specifically from the milling drum box, upward in the vertical direction. If the machine frame of the ground milling machine 1 is lowered, the wedge surfaces A1.1 and A1.2 come to overlap one another with respect to a virtual horizontal plane. An essential factor is that the elements of the second alignment device A2, which will be explained in greater detail below, are still "free of overlap", i.e., do not yet overlap one another in a virtual horizontal plane at this point. In FIGS. 4a to 4c, the milling unit 3 rests on the transport device. If now the ground milling machine 1 moves against the arrow direction a, i.e., moves backward in this specific case, the wedge surfaces A1.1 and A1.2 further approach one another. Each of the wedge surfaces extends in the horizontal plane essentially in a straight line obliquely toward the center in the working direction a or in the forward direction of advance. The wedge surfaces A1.1 and A1.2 of a pair are further designed complementary to one another.

In FIG. 4b, the wedge surface A1.1 and A1.2 have approached sufficiently close enough that the pair located at the right side (with respect to the view in FIGS. 4a to 4c) abuts one another already. This is not the case for the left pair yet. Thus, in the position shown in FIG. 4b, the milling unit 3 has a transverse offset to the right. If the ground milling machine is moved further, the milling unit is forced to the left by the effect of the wedge surfaces so that the transverse offset is compensated step by step.

The final position of this rough centering is shown in FIG. 4c. The pairs of the wedge surfaces A1.1 and A1.2 abut one another in a form fitting manner both on the right and the left side. If the ground milling machine would be further moved backward, it would carry with it the milling unit 3 via the contacting wedge surfaces, not least by the stop surfaces adjoining the wedge surfaces A1.1 and A1.2 and extending horizontally and transversely to the direction a.

Figure 5A:
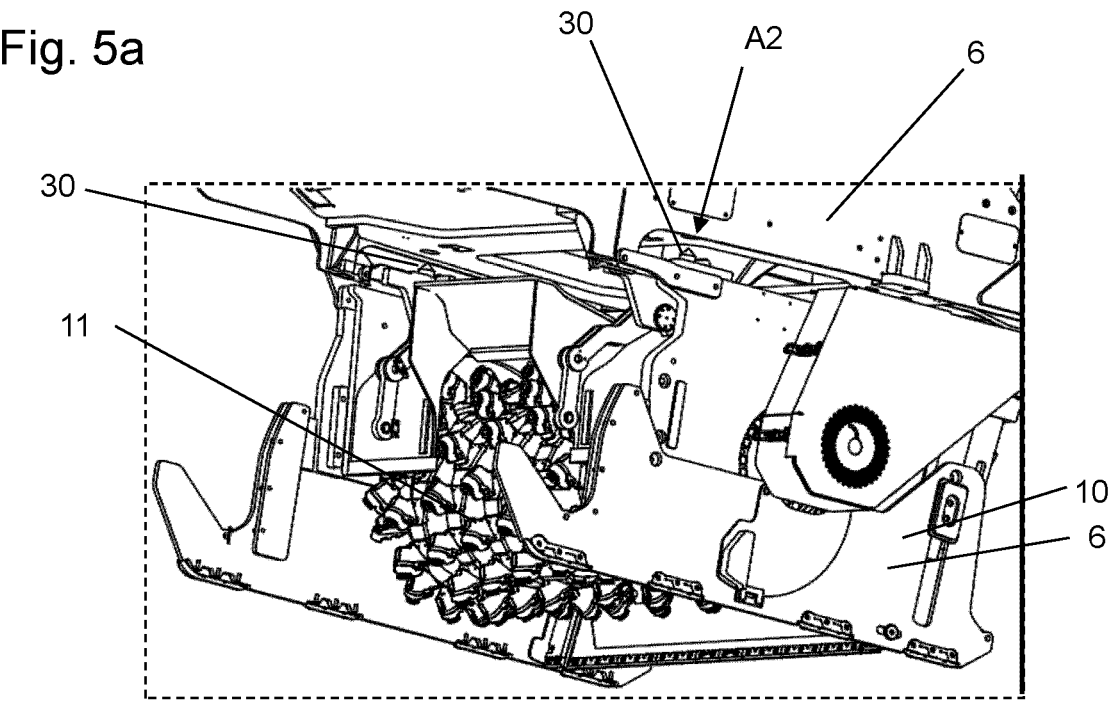
FIGS. 5a and 5b show detailed views concerning fine alignment with a second alignment device in a perspective view of the milling unit and the left side of the ground milling machine (detail) obliquely from the front.
Figure 5B:
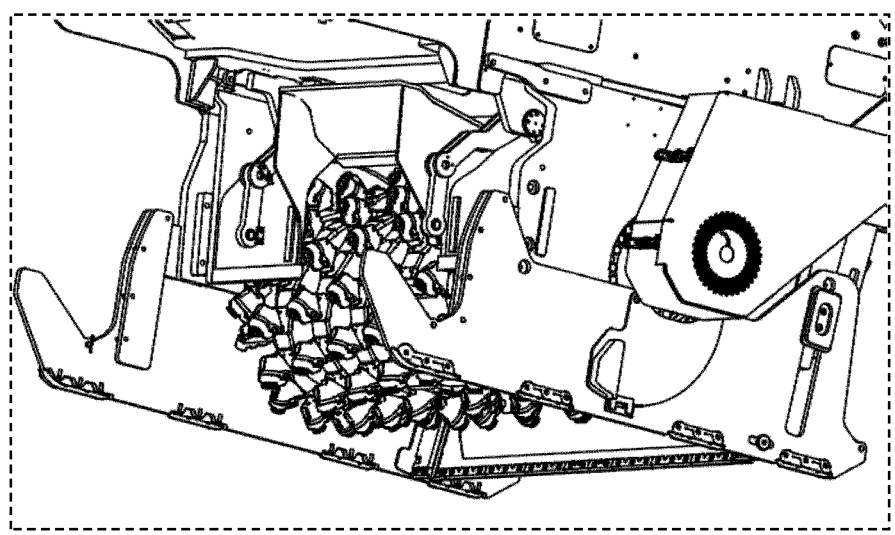

FIGS. 5a and 5b show the function of the second alignment device A2, and reference is made to FIGS. 6a to 7b in this respect. Essential elements of the second alignment device A2 are centering cones 30 protruding from the milling unit in the vertical direction, with said cones also being arranged spaced from one another transversely to the longitudinal direction of the ground milling machine. Receptacle bores are present at the machine frame for receiving the centering cones 30, although said bores are not visible in FIGS. 5a and 5b. FIGS. 5a and 5b illustrate the milling unit still in the state resting on the transport unit 13, said unit not being illustrated in these figures for the sake of clarity. Once the pre-centering by means of the alignment device A1 is finished, the tips of the centering cones rest reliably within the circumference of the receptacle bores at the machine frame viewed in the vertical direction. If the lifting columns are further lowered, the centering cones engage the receptacle bores so that the bores can slide-off with their edges on the centering cones. This achieves that the relative position of the milling unit 3 and the ground milling machine 1 are exactly aligned so that the milling unit 3 can be fastened to the ground milling machine, for example, by means of the fastening device described below. During fine alignment, the slide surfaces of the first alignment device A1 slide past one another in the vertical direction. Thus, it is important that the wedge surfaces of the first alignment device are constructed in such a way that they permit said movement. This is achieved in that they are designed in a straight fashion in the vertical direction, for example.

Figure 6A:
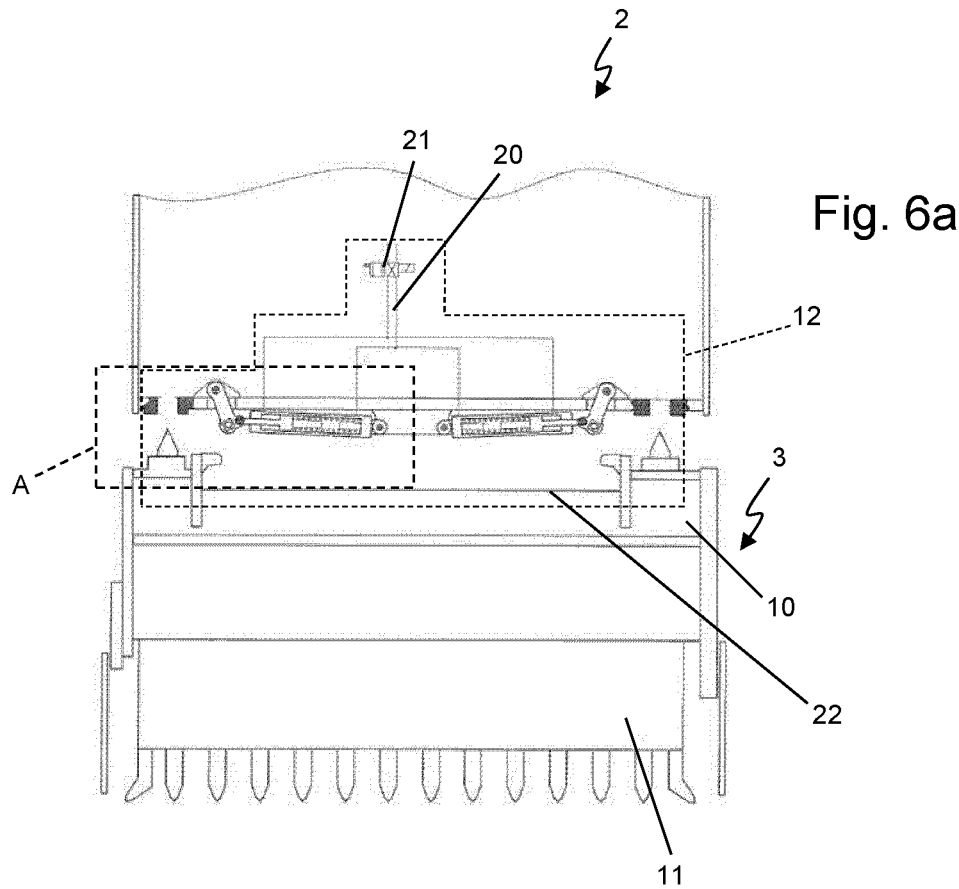
FIG. 6a shows a cross-sectional view of FIG. 2 with a milling unit pre-positioned relative to the machine part.
Figure 6B:
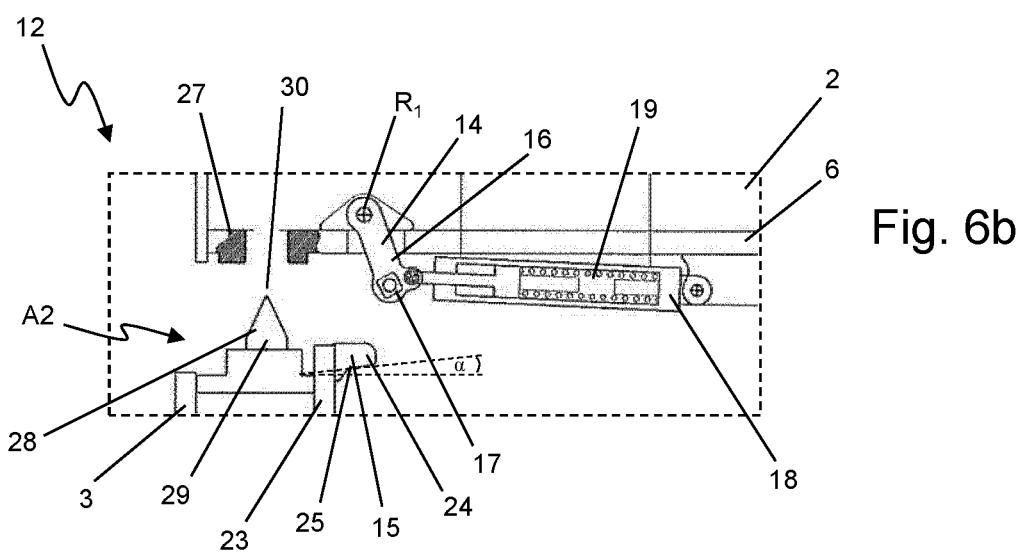

For further illustration, FIG. 6a shows the milling unit 3 in the position pre-positioned by the first alignment device A1 underneath the machine part 2, with the transport unit 13 as well as the lifting columns 5 and the travelling device 4 being omitted in this case for the sake of clarity. Furthermore, FIG. 6b illustrates region A of FIG. 6a in an enlarged view. FIG. 6a shows the arrangement viewed in the working direction a.

An essential factor for fastening the milling unit 3 to the machine part 2 or the machine frame 6 lies with the fastening device 12, essential details of which are particularly indicated in FIG. 6b. The fastening device 12 with its individual elements is partially supported on the milling unit 3 and partially supported on the machine part 2 in a fixed or movable manner. A complete dismounting of parts of the fastening device 12 from the milling unit 3 and from the machine part 2 is not provided so that the elements of the fastening device 12 are all in all arranged at the parts 2 and 3 in a fixed manner.

In the present exemplary embodiment, the fastening device 12 specifically includes a locking element 14 and a counter element 15. The locking element 14 is designed as a single-arm pivot lever pivotally mounted at the machine frame, which lever is movable, in this case pivotable, about a pivot axis R1 extending horizontally and in the working direction a between the release position indicated in FIG. 6b and the locking position, which is shown, for example, in FIG. 7b to be explained in greater detail below. At the end opposite the rotation axis R1, a locking protrusion 17 is present at the locking lever 16, which protrudes from the adjacent surface of the lever element toward the observer from the image plane in FIG. 6b. It may also be provided that said locking protrusion is arranged between two similarly designed locking levers 16 in the form of a support bracket.

Figure 7A:
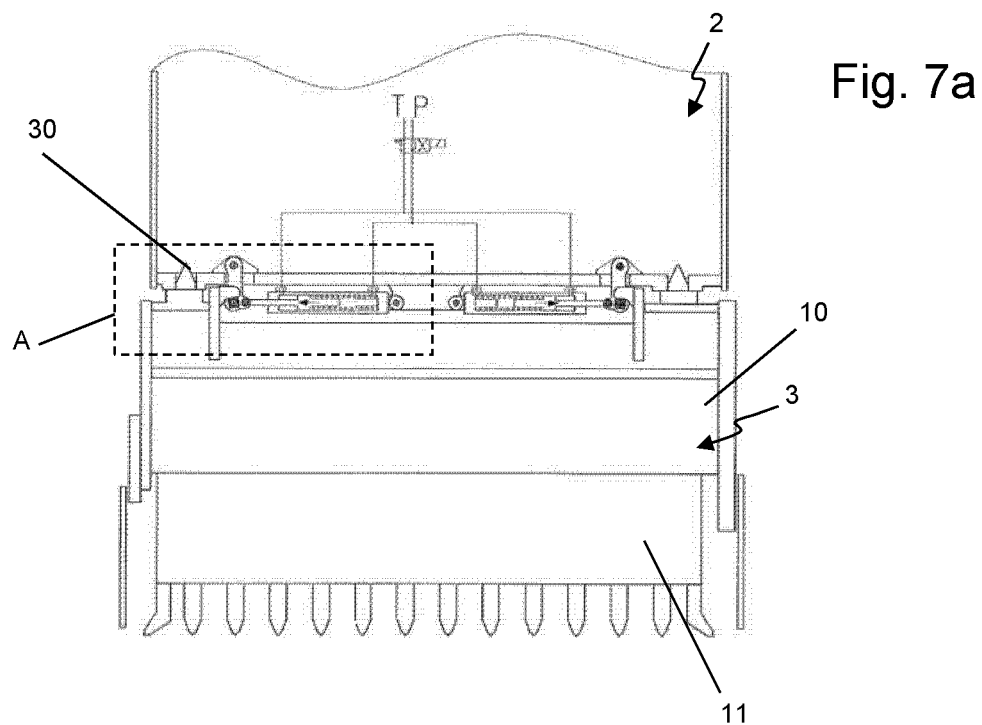
FIG. 7a shows a cross-sectional view of FIG. 2 with the fastening device in the locking position.
Figure 7B:
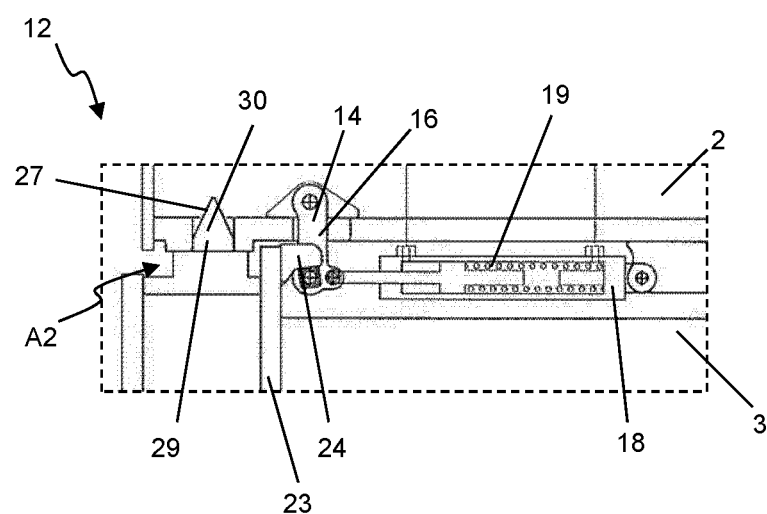
Figure 8A:
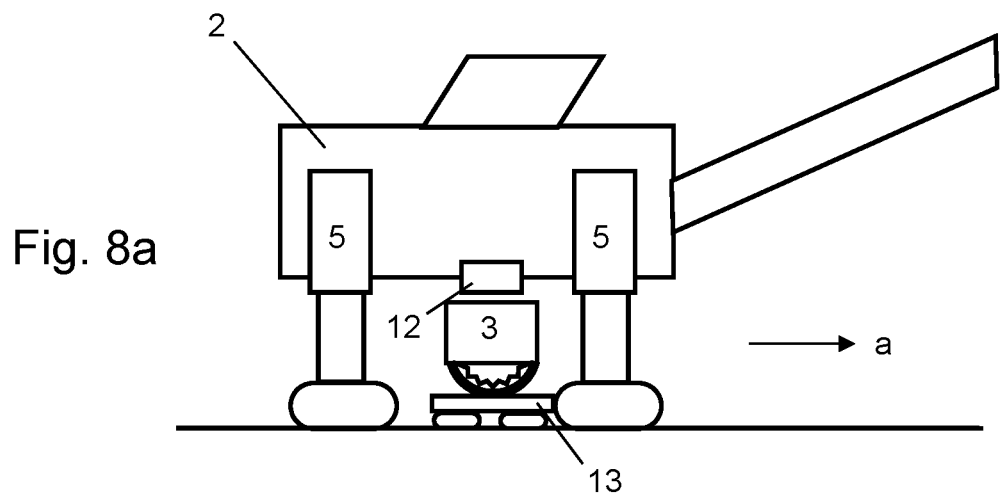
FIGS. 8a to 8f show the sequence of a mounting process with a suspension swing.
Figure 8B:
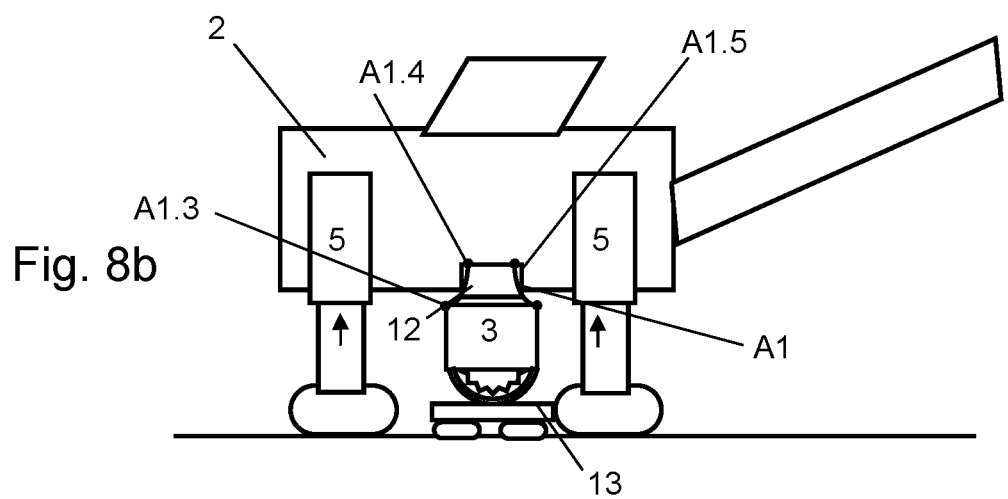
Figure 8C:
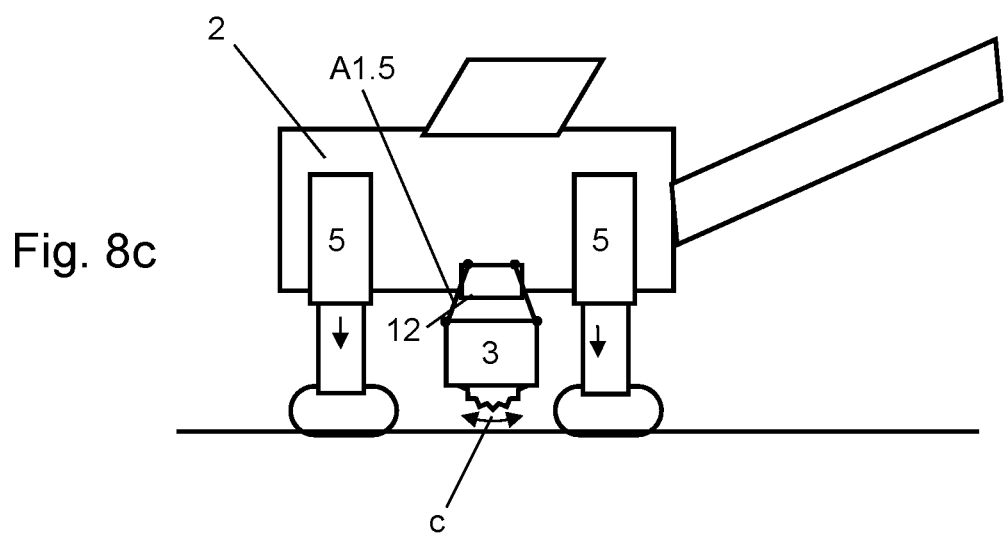
Figure 8D:
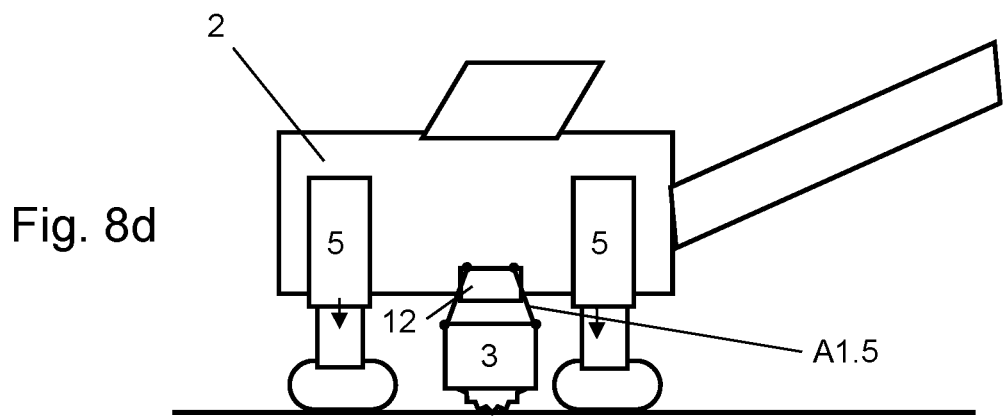
Figure 8E:
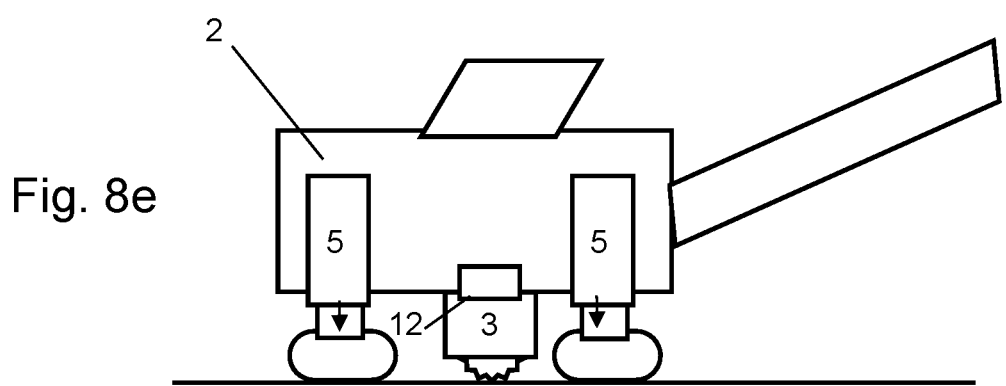
Figure 8F:
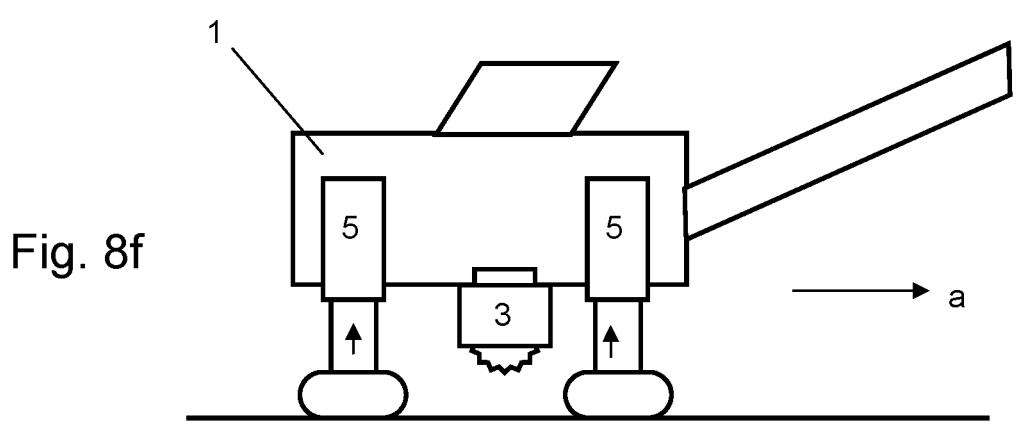

Adjustment of the locking lever 16, or of the locking element 14, from the release position illustrated in FIG. 6b into the locking position illustrated in FIG. 7b is effected automatically, driven by a pressure spring 19 arranged inside a drive element 18. The pressure spring 19 thus pushes the locking lever toward the locking position, and, in other words, acts in the direction of the locking position. For displacing the locking element 14 into the release position according to FIG. 6b, a hydraulic pressure application of the drive element 18 designed as a cylinder-piston unit is effected via a hydraulic circuitry 20 indicated in FIG. 6a by means of a corresponding valve 21. Thus, the overall arrangement ensures that in the case of a missing pressure application, the locking lever 16 automatically takes the locking position according to FIG. 4b driven by the pressure spring 19. Here, the hydraulic cylinder is articulated at the machine frame 2 at the side of the cylinder and at the locking lever 16 at the side of the piston, in each case in a joint-like manner. In the present exemplary embodiment, the drive device is thus entirely arranged at the side of the machine part 2 of the ground milling machine 1.

The fastening device 12 further includes the counter-element 15 which is designed as a fixed holding hook protruding from an upper wall 22 of the milling drum box with a web 23 projecting in the vertical direction and a locking protrusion 24 projecting vertically in a head region of the web 23. Here, the locking protrusion 24 is engaged behind by the locking protrusion 17 of the locking lever 16 for fastening the milling unit 3 to the machine part 2, viewed from the machine part 2, as particularly indicated in FIG. 7b. The stop surface 24' at the locking protrusion 24 for the locking protrusion 17 of the locking lever 16 extends at an angle α inclined to the horizontal plane and declines in the pivoting direction of the locking lever 16 in the direction of the locking position in the vertical direction downward. This ensures that the milling unit 3 is pressed against the machine part 2 in the vertical direction upward, so that the special design of the contact surface 25 with inclination in cooperation with the locking protrusion 17 acts as a clamping device 51 between the milling unit 3 and the machine part 2.

FIGS. 6a and 7a further illustrate that the fastening device 12 overall has two locking elements 14 and counter elements 15 each having one drive element 18 according to the previous explanations. The engagement or stop positions between the respective locking element 14 and the respective counter element 15 are arranged to be spaced apart from one another as far as possible transversely to the working direction toward the outer sides of the ground milling machine 1. An essential factor is that both drive elements 18 are connected to one another in parallel via the hydraulic circuit 20 and both are actuated via valve 21 simultaneously and at the same effect. The pressure application in the position illustrated in FIG. 6a thus causes a pivoting-in of the two locking levers 16 toward one another. Operation of the fastening device is effected via a suitable switch (not shown in the Figures), for example, in the operator platform 8 and/or laterally at the ground milling machine 1 close to the milling unit 3.

Separately and spaced apart from the fastening device 12, the second alignment device A2 is provided. Said device comprises a hollow-cylindrical receptacle opening 27 or trunnion receptacle at the side of the machine part 2, and, as a counter element at the side of the milling unit 3, the mandrel 28 or trunnion protruding in the direction of the machine part 2, i.e., in the vertical direction, said mandrel or trunnion including a cylindrical base part 29 and a centering cone 30 resting on the base part and tapering upward to become a tip. If, for fastening the milling unit 3 to the machine part 2, the milling unit 3 and the machine part 2 are moved toward one another from the position shown in FIG. 6b into the position shown in FIG. 7b, first the centering cone 30 with its tip gets into the region of the receptacle opening 27. In case of a slight imprecise alignment of the milling unit 3 relative to the machine part 2, the centering cone 30 may slide with its outer surface onto the edge of the receptacle opening 27 and thus cause exact positioning of the milling unit 3 relative to the machine part 2. Thus, in the region of the centering cone 30, there is a clearance for the mandrel 28 in the receptacle opening 27, the clearance becoming smaller along with an increasing alignment movement of the machine part 2 in the direction of the milling unit 3. If now also the cylindrically shaped base part 29 slides into the receptacle opening 27 upon continued insertion movement, a form fit between the outer surface shell of the base part 29 and the inner surface shell of the receptacle opening 27 is achieved, so that a form fit is achieved in the horizontal plane. In the direction of the horizontal plane, the milling unit 3 is positioned relative to the machine part 2 practically without any clearance. This effect is of particular importance since the form fit established by the centering and form fit device 26 of the second alignment device A2 in the direction of the horizontal plane causes a relief of the fastening device 12 in that the latter does not have to ensure a positional securing between the milling unit 3 and the machine part 2. Thus, the fastening device 12 exclusively needs to apply clamping forces in the vertical direction for securing the milling unit 3. The fastening forces to be applied by the fastening device 12 are comparatively low due to this functional separation of the vertical fixation and the horizontal fixation, so that there is no need to configure it in a particularly massive manner and also traction forces to be achieved may be comparatively low. FIGS. 6a and 7a illustrate that the centering and form fit device 26 is also provided multiple times between the milling unit 3 and machine part 2, in the present case two times in the Figures. Furthermore, it is essential that the centering and form fit device 26 in the horizontal plane is spaced apart further outward than the fastening device 12 with respect to the longitudinal center axis in the working direction a. As a result of the largest possible spacing from the outer sides, and thus the largest possible spacing from one another, of the centering and form fit device 26, optimum securing is achieved in the direction of the horizontal plane.

A synopsis of the figures illustrates that a very fast and moreover reliable dismounting and mounting of a milling unit 3 at a ground milling machine 1 will be possible. It is obvious that the specific design and arrangement of, in particular, the alignment devices A1 and A2 may vary, as long as the above-mentioned effects are achieved. For example, the arrangement of individual elements of the respective alignment devices A1 and/or A2 at the machine frame and at the milling unit 3 can be effected vice versa. It may be provided as well that the wedge surfaces are designed as extending toward one another against the forward direction of advance of the machine. Furthermore, the specific design of the fastening device may vary. Thus, such variants are, in particular, also comprised by the present invention in which the milling unit is connected to the machine frame via known screw bolt connections. However, in particular, with regard to the operational comfort and in view of the shortened exchange time, an automatically actuatable fastening device is preferred.

FIGS. 8a to 8f illustrate an alternative embodiment of a first alignment device. One aspect of the present invention of the shown embodiment is to suspend the milling unit 3 temporarily from the machine frame of the ground milling machine 1 in the type of a suspension swing. To this end, the first alignment device A1 comprises multiple fastening points A1.3 on the milling unit 3 and multiple fastening points A1.4 on the machine frame of the ground milling machine. The fastening points A1.3 and A1.4 serve for connecting a connection element A1.5. Preferably, in each case one fastening point A1.3 is connected to a fastening point A1.4 via in each case one connection element A1.5 (although in FIGS. 8a to 8f only the connection elements A1.5 present on the right side viewed in the working direction can be seen; in the present exemplary embodiment, a corresponding pair of connection devices A1.5 is provided on the left side as well). Thus, the entire alignment device comprises in the present exemplary embodiment a total of four such individual connections so that the milling unit 3 can be suspended from the machine frame of the ground milling machine 1 via four connection elements A1.5. The essential factor is that the connection elements A1.5 are connected to the fastening points A1.3 and/or A1.4 in such a way and/or are designed in such a way that they enable movement about at least one degree of freedom, respectively represent an at least partially flexible connection. This makes it possible that the milling unit swings relative to the machine frame in the arrow direction c (toward the observer in FIG. 8c) when the machine frame is lifted from the position shown in FIG. 8b by the extension of the lifting columns into the position shown in FIG. 8c, and thus takes a defined relative position relative to the machine frame of the ground milling machine 1. It will be readily understood that to this end the connection elements A1.5 have a defined length.

Once the swing movement is finished, the machine frame is lowered by the retraction of the lifting columns until the milling unit 3 rests on the ground (or optionally on a transport device still positioned thereunder), for example. This relieves the connection elements A1.5, enabling them to be dismounted and stored away, for example. If the machine frame is lowered even further by the retraction of the lifting columns, it comes to rest on the milling unit 3 from the top according to FIG. 8a or approximates the milling unit close enough for the milling unit 3 to be fastenable to the machine frame via the fastening device 12. Once this process is completed, the ground milling machine 1 may re-assume a transport height by the extension of the lifting columns and be moved to the place of operation.

In this alternative of the first alignment device A1, fine alignment can be achieved by means of the above described second alignment device A2, for example. The fastening device 12 can be realized in the above described ways and manners, for example.

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicant's invention.

What is claimed is:

1. A method for mounting a releasable milling unit to a machine frame of a ground milling machine, comprising the steps:
  a) suspending the milling unit from the machine frame of the ground milling machine via a flexible suspension connection provided between the milling unit and the machine frame;
  b) moving the ground milling machine toward the milling unit; and
  c) fastening the milling unit to the machine frame.

2. The method according to claim 1,
wherein a swinging of the milling unit suspended from the machine frame is effected in step a).

3. The method according to claim 2,
wherein the swinging comprises the following steps:
providing the flexible suspension connection between the milling unit and the machine frame of the ground milling machine;
lifting the ground milling machine and swinging the milling unit suspended from the machine frame.

4. The method according to claim 1,
wherein in step b) the ground milling machine is vertically adjusted relative to the milling unit by lowering the machine frame of the ground milling machine onto the milling unit.

5. A ground milling machine, comprising:
a machine frame;
a drive engine;
travelling devices driven by the drive engine which are connected to the machine frame via height-adjustable lifting columns; and
a milling unit comprising a milling drum for milling the ground material and a milling drum box for covering the milling drum to the sides and upward, the milling unit being configured to be fastened to the machine frame of the ground milling machine via a fastening device in a detachable manner,
wherein a flexible suspension connection is provided between the milling unit and the machine frame of the ground milling machine to suspend the milling unit from the machine frame prior to the milling unit being fastened to the machine frame via the fastening device.

6. The ground milling machine according to claim 5,
wherein the flexible suspension connection is a suspension swing via which the milling unit is suspended from the machine frame of the ground milling machine.

7. The ground milling machine according to claim 5,
wherein the flexible suspension connection is in the form of ropes, chains or straps.

* * * * *